UNITED STATES PATENT OFFICE

EDWIN P. COX, OF EDGEWOOD ARSENAL, MARYLAND

COATING COMPOSITION

Application filed May 23, 1929. Serial No. 365,553

(GRANTED UNDER THE ACT OF MARCH 3, 1883, AS AMENDED APRIL 30, 1928; 370 O. G. 757)

This invention described herein may be manufactured and used by or for the Government for governmental purposes, without the payment to me of any royalty thereon.

This invention relates in general to coating compositions and more particularly has reference to a preservative for textile fabrics and rubber.

It is well recognized that certain fabrics and fibers, and particularly rubber, deteriorate when exposed to sunlight and weather. Also, in many instances, ozone, and electric potential or discharge have been known to have a deleterious effect on material of this character.

The various coating compositions heretofore provided for lending protection against the various sources of injury have not been entirely satisfactory, as they have generally not prevented the penetration of light. Where rubber or other flexible or elastic materials have been used as the base for a film or coating of protective material in the form of a paint or a sheet, the change in form by reason of the elastic properties or flexing or compressing has set up strains which have resulted in cracks appearing on the surface or the coating becoming detached from the base.

An object of this invention is to provide a material for coating textiles and rubber, which may be applied in the form of a paint or a sheet.

Another object of this invention is to provide a coating for textiles or rubber through which no light can penetrate over the usual range of wave lengths.

Still another object of this invention is to provide a material for coating textiles or rubber, not subject to cracking or detachment when the form of a material upon which it is applied is changed.

A further object of this invention is to provide a material for coating textiles or rubber, not subject to the effects of strain.

With these and other equally important related objects in view which may be incident to my improvements, the invention comprehends the provision of a coating for protecting textiles and rubber, composed of a gum base and including certain other compounds to effect the requirements necessary for achieving the purposes of this invention, it being understood that a wide latitude in the range may be allowed in determining the proportions of ingredients for making up the coating, the quantity set forth being suitable for carrying the same into practical effect without limiting the improvements in their useful applications to the particular proportions or ingredients which, for the purposes of explanation, have been made the subject of description.

I have discovered that certain mixtures are suitable for the purposes hereinbefore described, employing as a base a suitable compound of rubber or gum. It is preferred that what is commonly known as smoked sheet be employed, as distinguished from crepe sheet, rubber, although it will be apparent that a number of the more common commercial products may be used.

I add to the crude gum or rubber, a pigment such, for example, as carbon black, in sufficiently large quantities to effectively prevent the passage or penetration of light with wave lengths below six thousand Angstroms into the compound. It is also essential to include a suitable plastic or softener, such as paraffin, wax or oil, in sufficient quantities to render the compound ductile and at the same time to eliminate to as great a degree as possible the inherent elastic properties of the material forming the base.

In compounding a coating material from the foregoing substances, it has been found that a preliminary mix made up in the following proportions by weight is highly satisfactory: smoked sheet, seventy-five parts; carbon black, twenty-five parts; paraffin, ten parts. The coating material may be successfully prepared by compounding the above solid components in a rubber mill at a temperature of approximately 170° F. until thorough dissipation of the non-rubber components throughout the rubber component is obtained.

It will be apparent that the process may be carried on over a wide range of temperatures and any suitable apparatus of the conventional type employed. It is to be understood further that the invention is in no wise restricted to the proportions set forth as exemplary or to the specific temperature or apparatus.

I have found it desirable, in many instances, to add a dye to the compound, such as oil scarlet, in sufficient quantities to lend more protection than is ordinarily afforded by the carbon black against light penetration. It is apparent that a wide choice of dyes is allowed if it is thought necessary to include one or more. An antioxidant or stabilizer may also be incorporated in the mix to increase the life of the compound. An effective antioxidant has been found in the commercial stabilizer known as "Age-rite", although any of the number of other readily available antioxidants found more suitable may be used.

When the following table is considered, showing various compounds which have proved successful, made up in varying proportions of these substances, the wide latitude allowed in compounding a mix suitable for the purpose of the present invention will be readily appreciated.

| Material | Parts by weight | | | |
|---|---|---|---|---|
| Smoked sheet | 75 | 100 | 100 | 100 |
| Carbon black | 25 | 37.8 | 47.3 | 63 |
| Paraffin | 10 | 20.0 | 25.0 | 33.3 |
| Age-rite | | 2.0 | 2.0 | 2.0 |
| Smoked sheet | 100 | 100 | 100 | |
| Carbon black | 37.8 | 63 | 47.3 | |
| Petroleum | 19.2 | 32.3 | 24.2 | |
| Age-rite | 2.0 | 2.0 | 2.0 | |

The proportions and ingredients enumerated in the latter formula are deemed to constitute the best compound where petroleum is used as a solvent.

These materials may be applied to fabric or fiber, and rubber and gum, surfaces in the manner already indicated. In many instances, it may be deemed desirable to impose a solid coat of the compound on the material to be protected through the medium of any suitable cement or gum. It is generally considered preferable, however, that the coating be applied in the form of a paint.

A suitable solution for this purpose may be obtained by dissolving or dispersing the compound to the extent of about 6% to 8% by weight in a suitable solvent. In this connection, gasoline, benzene and petroleum ether have been found to be excellent solvents. The thinned material may be applied as a paint with an ordinary brush or by an airbrush, also serving advantageously for carrying on a dipping process with the material which it is desired to treat, in the usual manner. When the coating is applied as a paint, it has been found advisable in most instances to use several coats, thus insuring complete coverage and at the same time obtaining a more rapid drying for a heavy coat.

It has been found that when material of approximately the specifications herein disclosed is properly applied as a covering to rubber or fabrics, either as a sheet or as a paint, it will protect the same even when bent, stretched, or flexed from the cracking or checking effect due to light, weather, ozone and electric potential or discharge, also serving to render the material upon which it is applied moisture proof.

There is thus accomplished by this invention a coating composition for protecting the variety of materials described that will prolong the life and efficiency of the materials upon which it is applied far beyond the normal span, having in practice increased the life of certain textile fabrics and rubber goods tenfold.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A coating composition comprising 75 to 100 parts of a smoked sheet rubber base, 25 to 63 parts of carbon black, 10 to 33.3 parts of paraffin, and from none to 2 parts of an antioxidant.

2. A coating composition comprising 100 parts of a smoked sheet rubber base, 37.8 parts of carbon black, 20 parts of paraffin, and 2 parts of an antioxidant.

In testimony whereof I affix my signature.

EDWIN P. COX.